United States Patent [19]
Santucci et al.

[11] 4,135,556
[45] Jan. 23, 1979

[54] CONTROL FOR THE WEFT-THREAD CARRIES IN THE SHED OF A MULTISHED LOOM

[75] Inventors: Nicola Santucci, Schio (Vicenza), Italy; Zabotin A. Aleksandrovic, Moscow, U.S.S.R.; Loschilin E. Dmitrievich, Moscow, U.S.S.R.; Galperin A. Lvovich, Moscow, U.S.S.R.; Onikov E. Archakovich, Moscow, U.S.S.R.; Sakharov B. Aleksandrovic, Mocow, U.S.S.R.; Borodin V. Alekseevich, Moscow, U.S.S.R.

[73] Assignees: Nuovo Pignone S.p.A., Italy; ZNIKHBI:Tsentralny Nauchne:issledevatelsky institut khlopehatobumezhnoi promyshlennesti, U.S.S.R.

[21] Appl. No.: 728,241

[22] Filed: Sep. 30, 1976

[30] Foreign Application Priority Data

Oct. 3, 1975 [IT] Italy .................. 27956 A/75

[51] Int. Cl.² .................. D03D 47/26; D03D 49/50
[52] U.S. Cl. .................. 139/436; 139/344
[58] Field of Search .............. 139/436, 336, 341, 344

[56] References Cited

U.S. PATENT DOCUMENTS

| 3,683,969 | 8/1972 | Strauss | 139/436 |
| 3,880,197 | 4/1975 | Bucil et al. | 139/436 |
| 3,900,049 | 8/1975 | Zabotin et al. | 139/436 |

*Primary Examiner*—Henry S. Jaudon
*Attorney, Agent, or Firm*—Morgan, Finnegan, Pine, Foley & Lee

[57] ABSTRACT

A method of and a device for stopping the movement of a weft-carrier or shuttle when an obstruction is in the shed of a loom without damaging the loom or fabric being woven. The device includes a power operated shuttle drive mechanism adapted to engage the shuttle to move the shuttle through a shed, and a sensitive section adapted to be responsive to forces produced by an obstruction in the shed. When such forces exceed a predetermined value, the sensitive section actuates a transducer to stop the supply of power to shuttle drive mechanism and reduces to zero the forces being applied to the shuttle by its drive mechanism.

7 Claims, 5 Drawing Figures

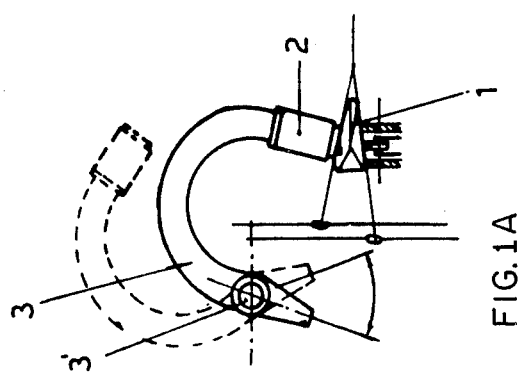
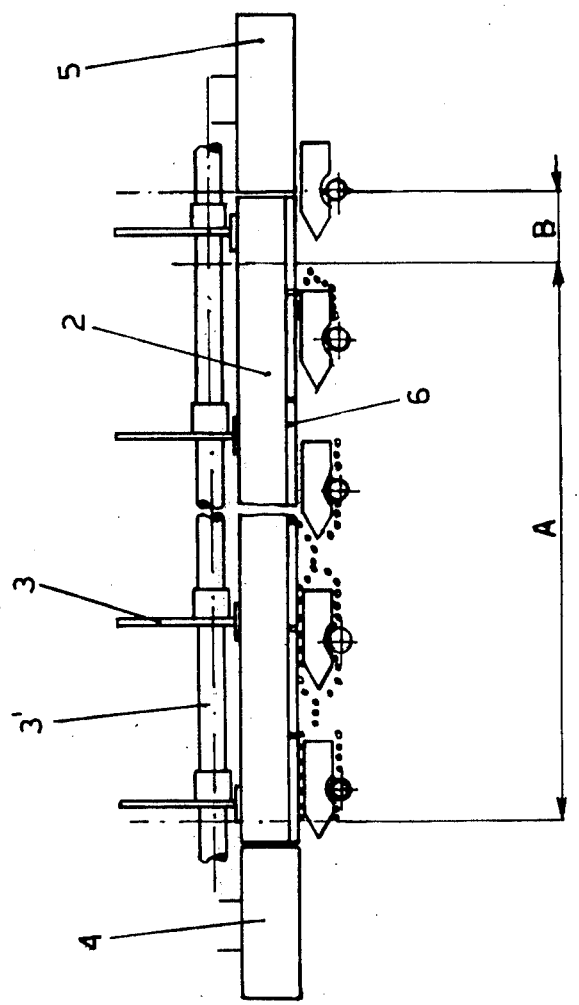

CONTROL FOR THE WEFT-THREAD CARRIES IN THE SHED OF A MULTISHED LOOM

This invention relates to multished looms and more particularly one of such looms.

If, for any reason, a weft carrier or shuttle in a loom is obstructed, considerable damage may be caused both to the loom and to the fabric being woven if the shuttle continues to be driven against the obstruction.

Prior to the present invention it was known to stop the loom when the weft carrier or shuttle met such an obstruction.

However, the defect of the prior method and apparatus was that, before the loom was stopped, the weft-thread carrier continued to be active against the obstacle in the shed and the force gradually increased both on the obstacle and the warp threads. In addition, this method and this apparatus required the application of powerful braking means for stopping the loom. For example, if a displacement in the order of 3 centimeters for the weft-carrier, which travels at a speed of 150 centimeters per second, is permissible after that the signal has been delivered; it is necessary to use apparatus which ensures the stoppage of the loom within a time of 0.04 seconds. The use of such apparatus will produce undesirable loads within the loom.

In addition, this method and this the use of intricate constructional arrangements.

The object of the present invention is to overcome the above enumerated defects.

The present invention provides both a method and a device for guiding the weft-carriers or shuttles in the shed of a multished loom, so that, in addition to the usual task of guiding the carriers into the shed and delivering the signal of the presence of an obstruction in the shed to the loom control system, the method and device disrupt the functional connection between the weft-carrier and the element which causes the displacement of same.

The present invention provides a loom having a weft carrier or shuttle, a power-operated shuttle drive mechanism adapted to engage the shuttle to move the shuttle through the shed, and a sensitive section adapted to be responsive to forces produced by an obstruction in the shed. When such forces exceed a predetermined value the sensitive section actuates a transducer to stop the supply of power to the shuttle drive mechansim and allows continued movement of the obstructed shuttle relative to its drive mechanism until the interference therebetween is reduced to zero.

The invention is further characterized in that the sensitive section is connected to the transducer by means of a resilient member, so that the sensitive section can go ahead in its motion be deforming the resilient member without causing damage.

The invention is also characterized in that the sensitive sections at the ends of the guide in the shed go beyond the warp boundaries and thus begin to control the forces as exerted by the weft carriers or shuttles in the sensitive sections, prior to the entrance of the carrier or shuttle into the shed.

For a better understanding of the invention, and to show how the same way be carried into effect, reference will now be made, by way of example, to the accompanying drawings, in which:

FIG. 1 is an overall view of the device generally taken in a direction parallel to the warp threads;

FIG. 1A is an end view of FIG. 1;

Figure 3:
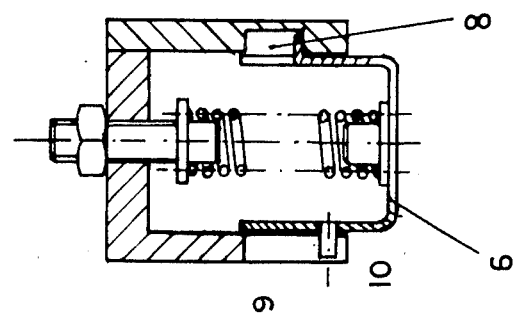
FIG. 3 is an end view, in cross section, of FIG. 2.

On the loom represented in FIG. 1 is arranged a warp which has a width A and which is made up of a plurality of warp threads represented in FIG. 1 by small circles. The warp threads are formed into a number of sheds by a mechanism which is not shown in the drawings. By manipulating the warp threads, these sheds progress across the warp from right to left as seen in FIG. 1. In each shed, and moving with the shed, is disposed a weft carrier or shuttle 1. Each weft carrier or shuttle 1 is driven around a travel path by a shuttle drive mechanism which comprises an endless chain, not shown, carrying a plurality of rollers 15.

Each weft carrier or shuttle 1 has a cavity in which is located a roller 14. When driving a shuttle 1 through a shed, a respective one of the rollers 15 engages the rollers 14 of the shuttle 1. In a section of the shuttle travel path which passes across the warp and extends for a short distance beyond each edge of the warp, the shuttle 1 is normally held down on the respective roller 15 by force responsive means comprising a single guiding beam 2 and a plurality of spring loaded sensitive sections 6, which press against the shuttles 1 through some of the warp threads. The beam 2 is connected to a rotatable shaft 3' by supporting members 3. The shaft 3' can be rotated, either manually or by automatic means, between a working position, shown in full lines in FIG. 1A and an inoperative position, shown in broken lines in FIG. 1A.

Further, fixed guide 4 and 5 are provided at each end of the beam 2 and are spaced from the beam 2. The fixed guides 4 and 5 may extend to some distance from the warp. The beam 2 is slightly longer than the width A of the warp, and so projects at each end, as indicated by the dimension B at the right hand of the warp. The dimension B is greater than or approximately equal to the length of a shuttle 1.

Figure 2:
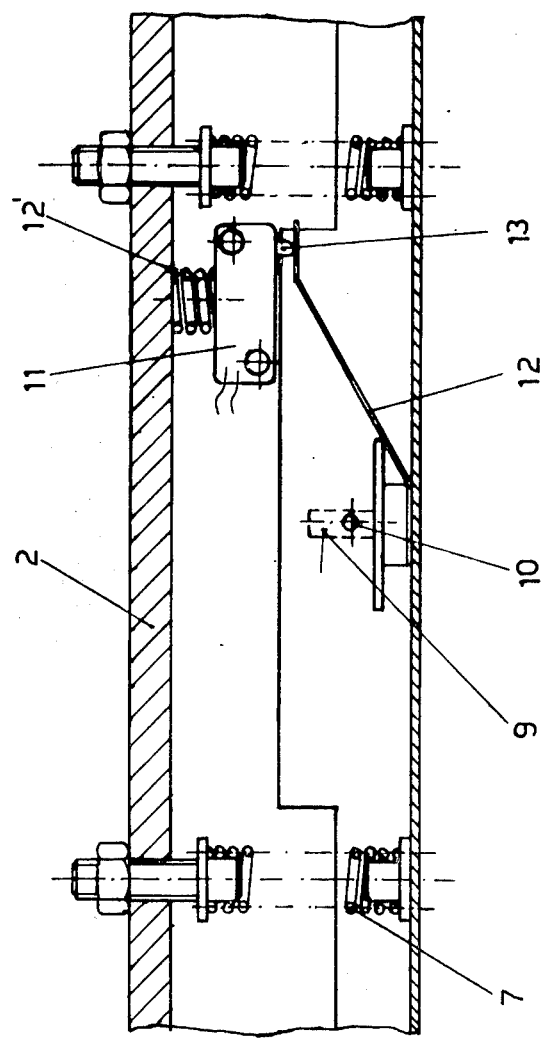
FIG. 2 is an enlarged cross-sectional view of part of the loom of FIG. 1.

The construction of the beam 2 and the sensitive sections 6 is shown more clearly in FIGS. 2 and 3. The beam 2 comprises generally a hollow square section which is open at its lower side. The sections 6 are located in the opening. Limited displacement of each section 6 is permitted by a groove 8 in the beam 2 which receives a projecting part 6' of the section 6. To limit movement of each section 6 in the direction of motion or the shuttle 1, a dowel 10 of each section 6 projects into a spline 9 of the beam 2. The spring-loading of the sections 6 is effected by springs 7, which bias the sections 6 downwardly, i.e., towards the shuttles 1, and which are not shown in FIGS. 2 and 3.

Mounted inside the beam 2, one to each section 6, is a transducer 11, having an actuating component 13. The transducer 11 is connected resiliently to the beam 2 by a spring 12' so that displacement of the respective section 6 greater than that required to actuate the transducer 11 does not damage the transducer 11. A resilient member 12 is fixed to each section 6 and is arranged to depress the actuating component 13 when the section 6 moves upwards. The transducer 11, when actuated by depression of the actuating member 13, interrupts the supply of power to the loom.

In operation of the loom, each drive roller 15 applies a force P. (see FIG. 4) to the shuttle roller 14 of each respective shuttle 1. This force P is inclined, by an angle α, towards the section 6 relative to the direction of travel of the shuttle 1. The force P can be resolved into two components Px and Py. The component Px is the force which drives the shuttle against the obstruction force P', and the component Py applies the shuttle against the section 6.

Figure 4:
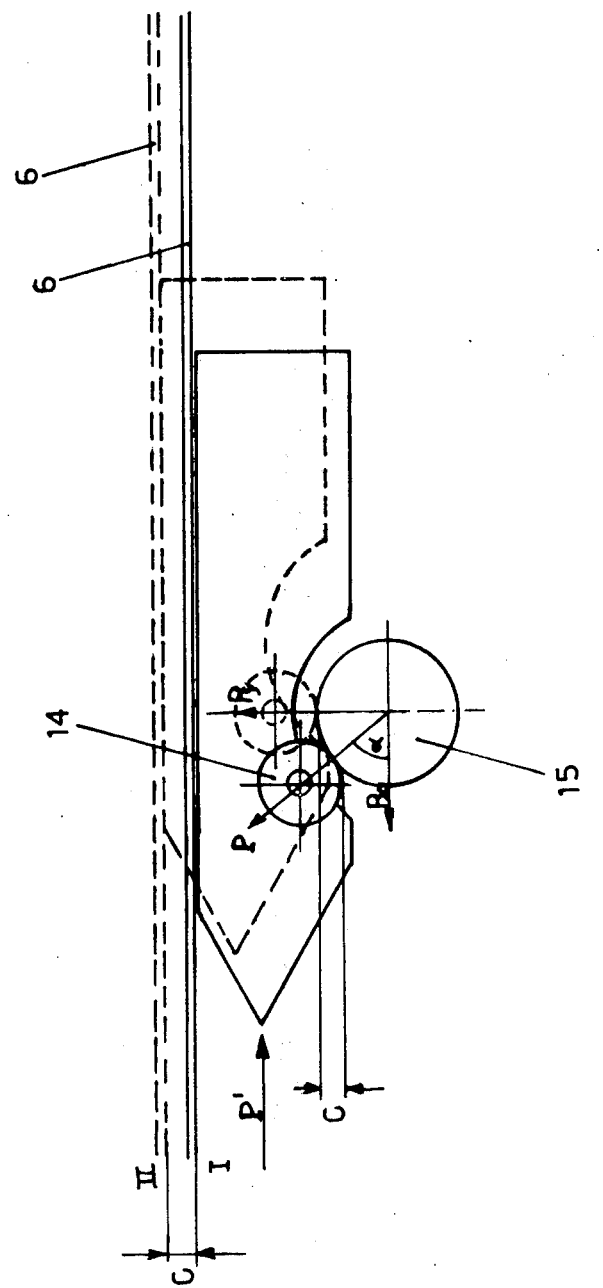
FIG. 4 is diagrammatic view of a shuttle and means for driving it in the loom of FIG. 1.

In normal operation, the magnitude of the component Py is less than the force applied by the springs through the section 6 so the guide sections 6 afford a rigid guide surface at a level I indicated in full lines in FIG. 4. However, if the shuttle 1 encounters an obstruction, the obstruction force P' will increase the magnitude of the force P will also increase, as will the component Py. If the force P increases by a sufficient amount the magnitude of the component Py will exceed the force applied by the springs 7, and the section 6 against which the shuttle 1 bears at that instant will be displaced inwardly of the beam 2 by the shuttle 1 and will actuate the transducer 11. The power supply to the loom, and therefore to the shuttle drive mechanism, will then be interrupted. However, the parts of the loom have considerable momentum, and will not stop instantaneously. Thus the drive roller 15, while slowing down, could still exert enough force on the obstructed shuttle 1 to cause damage to parts of the loom or to the fabric being woven. To avoid this the drive roller 15 and the shuttle 1 are constructed so that the magnitude of the component Px is limited.

In displacing the section 6, the shuttle 1 itself will have riden up slightly over the roller 15, thus increasing the angle α and, consequently, the component Py and the force P. If the magnitude of the component Py is sufficient, the shuttle will ride up, against the action of the springs 7, until the angle α is 90° as illustrated in FIG. 4 in dotted lines at which point the sections 6 are at the level II which is at a distance C above the level I. In this condition, the magnitude of the component Px is zero, that is, there is no force applied by the drive roller 15 in the intended direction of travel of the shuttle against the obstruction force P'. The shuttle 1 will then stop, even if the roller 15 continues to move under the momentum of the shuttle drive mechanism. The maximum displacement of the section 6 by the amount C is allowed by the dimensions of the groove 8 in the beam 2. The fact that the sections 6 can be displaced further than is necessary to actuate the transducer 11 means that warp threads trapped between the shuttle and the guide element 6 are not subjected to excessive pressures.

What we claim is:

1. A method of stopping the movement of a shuttle in a loom in the path of its intended direction of movement along the loom when an obstruction in the shed of such loom produces a force opposing the movement of the shuttle which exceeds a predetermined value, the loom being provided with a power-operated shuttle drive mechanism having a roller for drivably engaging a roller on the shuttle, the method comprising:

engaging the drive roller and shuttle roller on a line joining the rotary axes of said rollers which is inclined toward the direction of movement of the shuttle along the loom, thereby providing a vertical force component and a horizontal force component which drives the shuttle in the intended direction of movement along the loom even against obstructive forces;

interrupting the supply of power to the shuttle drive roller when the obstruction force in the shed causes the vertical force component on the shuttle to exceed the predetermined value, and transversely moving the shuttle within the path of its intended direction of movement along the loom to thereby reduce to zero the horizontal force component on the shuttle roller.

2. A device for stopping a weft-carrier or shuttle in the path of its intended direction of movement along the loom when an obstruction is in the shed of a loom to prevent damage to the loom and fabric being woven, comprising:

a shuttle for carrying weft thread in the shed having a roller thereon through which said shuttle is driven in its intended direction along the loom;

a power operated shuttle device mechanism having a drive roller adapted to engage said shuttle roller for driving the same, and wherein the line joining the rotary axes of said rollers is inclined toward the direction of movement of said shuttle along the loom;

means operatively connected to said shuttle in the shed and responsive to a force produced by an obstruction in the shed to interrupt the supply of power to said shuttle drive mechanism when said obstruction forces exceeds a predetermined value; and wherein said shuttle is transversely displaced within its path of intended direction of movement along the loom when said shuttle is obstructed, causing said shuttle and shuttle roller to ride over said drive roller and reduce to zero the force applied by said drive roller in the intended direction of movement of such shuttle along the loom.

3. The device set forth in claim 2, in which said means comprise a fixed beam positioned in the warp area of the loom, a section movably mounted to said beam, spring means within said beam which bias said section toward said shuttle, a transducer connected to said beam and to the power operated shuttle drive mechanism which includes an actuating component connected to said transducer, and a resilient member connected to said movable section and adapted to actuate said transducer component which, in turn, interrupts the power supply to said shuttle drive mechanism, and wherein said actuation occurs when an obstruction in the shed produces a force which opposes movement of the shuttle and exceeds a predetermined value, to thereby interrupt the supply of power of said shuttle drive mechanism.

4. The device set forth in claim 2, in which longitudinal movement of said section relative to said beam is limited by a slot and a cooperating dowel, one of which is on said section and the other one of which is on said beam.

5. The device set forth in claim 2, in which said transducer is mounted resiliently on said beam.

6. The device set forth in claim 2, in which the maximum displacement of said section in the direction transverse of said beam is limited by a groove and a cooperating projection, one of which is on said section and the other one of which is on said beam.

7. The device set forth in claim 6, in which a plurality of said shuttles are provided which, in operation of the loom, are each driven one after the other along said section by respective rollers of said shuttle drive mechanism.

* * * * *

UNITED STATES PATENT AND TRADEMARK OFFICE
CERTIFICATE OF CORRECTION

PATENT NO. : 4,135,556
DATED : January 23, 1979
INVENTOR(S) : Nicola Santucci, et al It is certified that error appears in the above-identified patent and that said Letters Patent are hereby corrected as shown below:

First page, "[54]", correct the title to read

-- DEVICE FOR GUIDING THE WEFT-THREAD CARRIERS IN THE SHED OF A MULTISHED LOOM --;

Col. 1, correct the title to read -- DEVICE FOR GUIDING THE WEFT-THREAD CARRIERS IN THE SHED OF A MULTISHED LOOM --;

line 5, delete "one of" and insert -- to a method of and apparatus for stopping the movement of shuttles in --;

line 23, after "delivered" change the semi-colon ";" to a comma -- , --;

UNITED STATES PATENT AND TRADEMARK OFFICE
CERTIFICATE OF CORRECTION

PATENT NO. : 4,135,556
DATED : January 23, 1979
INVENTOR(S) : Nicola Santucci, et al It is certified that error appears in the above-identified patent and that said Letters Patent are hereby corrected as shown below:

Col. 1, line 27, after "this" (second occurrence) insert

-- apparatus require --;

Line 54, correct "be" to read -- by --.

Col. 2, line 8, after "circles" insert a period -- . --.

line 29, correct " 3'" (both occurrences to read

-- 3' --.

Col. 4, line 50, after "power" correct "of" to read -- to --.

Signed and Sealed this

Fourth Day of September 1979

[SEAL]

Attest:

LUTRELLE F. PARKER
Attesting Officer
Acting Commissioner of Patents and Trademarks